(12) United States Patent
Finke et al.

(10) Patent No.: US 10,051,872 B2
(45) Date of Patent: Aug. 21, 2018

(54) APPARATUS AND METHOD FOR AUTOMATICALLY OBTAINING FLESH FROM BEHEADED AND GUTTED FISH

(71) Applicant: Nordischer Maschinenbau Rud. Baader GmbH + Co. KG, Lubeck (DE)

(72) Inventors: Hans Finke, Lubeck (DE); Michael Jurs, Neustadt (DE); Thomas Grabau, Lubeck (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 15/568,395

(22) PCT Filed: Apr. 6, 2016

(86) PCT No.: PCT/EP2016/057505
§ 371 (c)(1),
(2) Date: Oct. 20, 2017

(87) PCT Pub. No.: WO2016/169767
PCT Pub. Date: Oct. 27, 2016

(65) Prior Publication Data
US 2018/0153182 A1    Jun. 7, 2018

(30) Foreign Application Priority Data

Apr. 20, 2015   (DE) ..................... 10 2015 106 010

(51) Int. Cl.
*A22C 25/16*   (2006.01)
*A22C 25/08*   (2006.01)
(52) U.S. Cl.
CPC .............. *A22C 25/16* (2013.01); *A22C 25/08* (2013.01)

(58) Field of Classification Search
CPC ......... A22C 25/00; A22C 25/08; A22C 25/14; A22C 25/142; A22C 25/145; A22C 25/16
(Continued)

(56) References Cited

U.S. PATENT DOCUMENTS 2,479,010 A    8/1949   Jones
4,748,723 A *  6/1988   Braeger ............... A22C 25/166
                                                         452/122

(Continued)

FOREIGN PATENT DOCUMENTS

DE    2833097 B2    3/1979
DE   19881497 C1    4/2003

(Continued)

OTHER PUBLICATIONS

International Search Report dated Jul. 5, 2016 from International Patent Application No. PCT/EP2016/057505, filed Apr. 6, 1016.

(Continued)

*Primary Examiner* — Richard T Price, Jr.
(74) *Attorney, Agent, or Firm* — Sunstone IP

(57) ABSTRACT

An apparatus and method for automatically recovering flesh from beheaded and gutted fish, comprising a transport device for transporting the fish tail-first along a transport path in transport direction T, and a separating device (14) for separating the flesh from the bone structure, wherein the separating device has at least two rotatably driven and controllable circular knives arranged at a distance from each other on mutually opposing sides of the transport path in order to form a gap S. The two circular knives are designed to be pivoted about an axis I, II that differs from a horizontal orientation, wherein the axes I, II are oriented in such a way that, by pivoting the circular knives about the axes I and II, the point P of the smallest gap size between the circular (Continued)

knives can be positioned differently from the lowest knife point M of the two circular knives.

20 Claims, 2 Drawing Sheets

(58) Field of Classification Search
USPC .............................. 452/157, 156, 149–155
See application file for complete search history.

(56) References Cited

U.S. PATENT DOCUMENTS

| | | | |
|---|---|---|---|
| 6,200,211 B1 * | 3/2001 | Braeger | A22C 25/16 452/161 |
| 6,280,313 B1 * | 8/2001 | Braeger | A22C 25/16 452/161 |
| 6,322,437 B1 | 11/2001 | Grabau et al. | |
| 6,994,617 B2 * | 2/2006 | Jakobsen | A22C 25/16 452/160 |
| 7,090,574 B2 * | 8/2006 | Braeger | A22C 25/16 452/161 |
| 8,814,637 B2 * | 8/2014 | Jurs | A22C 25/16 452/162 |
| 8,956,205 B2 * | 2/2015 | Kowalski | A22C 25/16 452/135 |

FOREIGN PATENT DOCUMENTS

| | | |
|---|---|---|
| DE | 60311815 T2 | 11/2007 |
| EP | 1526776 B1 | 2/2007 |
| WO | 89/10698 A1 | 11/1989 |

OTHER PUBLICATIONS

International Preliminary Report on Patentability dated Oct. 24, 2017 from International Patent Application No. PCT/EP2016/057505, filed Apr. 6, 2016.

* cited by examiner

US 10,051,872 B2

APPARATUS AND METHOD FOR AUTOMATICALLY OBTAINING FLESH FROM BEHEADED AND GUTTED FISH

CROSS REFERENCE TO RELATED APPLICATION(S)

This application is a U.S. National Stage Entry of International Patent Application No. PCT/EP2016/057505, filed Apr. 6, 2016, which claims the benefit of German Patent Application No. 102015106010.8, filed Apr. 20, 2015, the disclosures of which are hereby incorporated entirely herein by reference.

BACKGROUND

Technical Field

The invention relates to an apparatus for automatically recovering flesh from beheaded and gutted fish, comprising a transport device for transporting the fish tail-first along a transport path in transport direction T, and a separating device for separating the flesh from the bone structure, the separating device having at least two rotatably driven and controllable circular knives which are arranged at a distance from each other on mutually opposing sides of the transport path in order to form a gap S.

The invention further relates to a method for automatically recovering flesh from beheaded and gutted fish, comprising the steps: Transporting the fish tail-first along a transport path in transport direction T by means of a transport device, and separating the flesh from the bone structure by means of a separating device, the separation taking place by two rotatably driven circular knives of the separating device, which knives are arranged at a distance from each other on mutually opposing sides of the transport path in order to form a gap S and are controlled.

State of the Art

Such apparatuses and methods are used in the fish processing industry to recover the flesh or at least parts thereof from beheaded and at least partly or mainly gutted fish. In other words, the apparatuses and methods referred to are the basis or a component part of recovering fillets from fish. For this, the fish are automatically processed on the ventral side and/or dorsal side in that the flesh attached to the bone structure is detached and separated therefrom by separating devices. The fish are transported tail-first to or through the individual processing stations by means of the transport device.

DE 198 81 497 C1 describes an apparatus having the features of the preamble of claim 1. This apparatus has a setting option for the circular knives so as to variably adjust the inclination of the circular knives relative to each other when setting up the apparatus. For this purpose, the circular knives are pivotable or tiltable about a substantially horizontally oriented axis A, B. Viewed in transport direction T of the fish, the circular knives can thus be pivoted or tilted out of and back into a parallel arrangement, in which the circular knives are at the same distance relative to each other at every point of the circumference, into a V-shaped position, in which the circular knives have, for example, the smallest distance from each other at their lowest knife point. This means that the knife angle, that is the angle of both circular knives to each other, is variable. However, the drawback is that the distance a between the two circular knives in the region of the smallest gap distance, usually at the lowest knife point M of the two circular knives, is to be adjusted to a fixed minimum gap size suitable for different fish sizes. In other words, the position/orientation of the circular knives relative to each other during the separating or cutting process is unchangeable with respect to the position of the point of the smallest gap distance. On the one hand, the aim is the smallest possible gap size for maximum yield. On the other hand, the largest possible gap size is to be preferred for cutting free the flesh injury-free without fin remnants or fin support remnants or fin seams. The size of the distance or gap size, which is set once and is usually about 5 mm, and the position/orientation of the circular knives relative to each other, which is set once, represent a compromise between a maximum possible yield on the one hand and the prevention of incorrect incisions on the other hand. In each case both objectives can be achieved only partially with the compromise of a non-adjustable position/orientation of the circular knives relative to each other found by the known apparatus, combined with the possibility of changing the distance between the circular knives and of adjusting the inclination about a horizontal axis.

In the case of different fish species, the known apparatuses and methods result in particularly high yield losses and/or injuries to fins/fin supports/fin seams during the recovery of flesh due to the fixed orientation/position of the circular knives relative to each other in respect of the position of the point of the smallest distance. This problem relates, for example, to white fish and, in particular, to cod in which the backbone has a shape which varies from tail to head. Due to the rigid orientation of the circular knives in respect of the position of the point of the smallest gap size, the result is incorrect incisions and/or yield losses in the region of the backbone. In the case of other fish species, e.g. salmon, there are particularly fleshy regions in the region of the backbone (which in the following is also referred to as the central bone or spine), particularly in the region between tail and dorsal fin, which can only be harvested unsatisfactorily with the known apparatuses and methods. Therefore, for the reasons mentioned, after processing with the known apparatus or the known method, portions that consist purely of flesh exist in the region of the backbone when the orientation of the circular knives is set to a safe position that prevents incorrect incisions. If, on the other hand, the circular knives are set to a yield-optimized orientation, the result may be incorrect incisions.

SUMMARY

Thus the object of the invention is to create an apparatus by means of which it is possible to implement more yield-efficient separation/recovery of flesh which at the same time prevents fin support injuries. The object of the invention is also to propose a corresponding method.

This object is achieved by an apparatus having the features referred to hereinbefore in that the two circular knives are designed to each be pivotable about an axis I, II that differs from the horizontal orientation, the axes I, II being oriented in such a way that, by pivoting the circular knives about the axes I and II, the point P of the smallest gap size between the circular knives can be positioned differently from the lowest knife point M of the two circular knives. With this embodiment according to the invention, the mutually opposing constraints or objectives are reconciled with each other in the best possible manner. In other words, the apparatus according to the invention makes it possible to adjust the gap size individually and as required in respect of size and situation/position on the circumference of the circular knives such that each fish can be processed in a yield-optimized and quality-optimized manner. Due to the fact that the axes I, II are oriented differently to the horizontal, that is they are at an angle to the horizontal, the point P of the smallest gap size can "travel" on the circumference of the circular knives, starting from the lower apex of said circular knives, by pivoting about the axes I, II, that is depending on where it is actually needed at the time. In other words, the point of the smallest/narrowest gap size can be in front of or behind the vertical symmetry axis of the circular knives such that the fish meets the narrowest gap region on entering between the pair of circular knives or exiting out of the pair of circular knives. In simple terms, the invention enables product-specific control/guidance of the circular knives about a pivot axis which is preferably oriented vertically to the transport plane E, with the effect that, during a separating incision, the distance between the circular knives at almost every point of the circumference can be selected, at least in sections or temporarily, to be so large that on the one hand damage to fin supports can be excluded and so small that on the other hand the maximum yield is achieved. It is possible with the invention to ideally combine the so-called V-position of the two circular knives, in which said circular knives have the point of the smallest distance at the lower apex of the circular knives during a separating incision, that is they are directed vertically downwards (this position is desired in the region of the fish tail, for example, to provide sufficient space for the fin seams in the tail region), and the so-called X-position of the two circular knives, in which the point of the smallest distance lies above the lower apex of the circular knives, that is, for example, displaced upwards from the lower apex against the direction of fish travel (this position is desired in the region of the backbone, for example, in order to travel as closely as possible along the backbone with the circular knives), which leads on the one hand to a gain in yield and on the other hand minimizes incorrect incisions.

In the apparatus according to the invention, the circular knives are designed and configured to pivot about the axes I, II during operation of the apparatus, that is while recovering flesh. In other words, the orientation of the circular knives relative to each other can be varied over the length of a fish during the processing thereof in order to respond to the different circumstances, in particular the changing anatomy.

A preferred embodiment is characterized in that the two circular knives are arranged above the transport device and are designed and configured to perform the entire dorsal incision. As a result, the invention is focused on the especially fleshy dorsal region in order to achieve particularly high yield efficiency.

The two circular knives are preferably designed and configured for cutting free the dorsal spokes. The region between the tail fin and in particular the tail root on the one hand and the dorsal fin on the other hand is especially fleshy, particularly in salmon, such that the design and configuration of the circular knives for cutting free the dorsal spokes has a particularly significant effect on increasing the yield.

In a preferred development of the invention, the axes I and II are oriented at an angle between 0° and 10° and in particular between 0° and 6° to the vertical orientation. A vertical or substantially vertical orientation, which also includes a deviation of 6°, is particularly well suited to achieving a "shift" of the point P with the smallest gap size, which is relevant for increasing the yield, with small pivoting movements. In other words, a slight pivoting movement about the axes I, II oriented according to the invention, which is optionally initiated by the fish itself and/or is dependent on detected and/or determined measuring data, results in the point P of the smallest gap size being directly and precisely adjustable.

A further embodiment according to the invention is characterized in that only the circular knives are each designed and configured to each be pivotable themselves about the axis I, II. As a result, a simple and easy-to-handle adjustment of the circular knives is implemented.

A further embodiment is characterized in that the entire units, each comprising a drive and a circular knife, are each designed and configured to be pivotable about the axis I, II. This configuration is structurally simple and sturdy and thus provides for particularly precise adjustment of the circular knives.

An especially preferred development of the invention is characterized in that the apparatus comprises measuring means for detecting and/or determining fish-size-relevant data in such a manner that the two circular knives are controllable dependent on the detected and/or determined measuring data, namely are each pivotable about the axis I, II that differs from a horizontal orientation. So that the separating devices or, more precisely, the circular knives can process each fish precisely and individually, the fish-size-relevant data, such as length and/or thickness and/or position of the tail root and/or position of the dorsal fin, etc., are detected and/or determined. The circular knives can then be individually controlled by means of a control system to recover flesh for varying fish sizes based on the detected and/or determined data. In this case, controlling comprises all movements, namely in particular all pivoting, tilting and rotary movements of the circular knives as well as other setting (adjusting) steps necessary for separation.

An expedient development of the invention is characterized in that a pneumatic and/or servomotor-controlled actuating mechanism is assigned to the circular knives for performing the adjusting or pivoting movement about the axes I, II. This development according to the invention enables fast and accurate adjustment of the circular knives.

Another especially preferred embodiment of the invention provides that the two circular knives are designed so as to be at least partly freely movable, in such a manner that they can be controlled at least partly by the actual fish to be processed. As a result, it is possible to achieve a simple construction of the apparatus which nevertheless implements improved yield and a reduction in incorrect incisions.

A further preferred embodiment of the invention is characterized in that the two circular knives are designed so as to be freely movable, in such a manner that they can be controlled exclusively by the actual fish to be processed, namely they are each pivotable about the axis I, II that differs from a horizontal orientation. This embodiment enables especially simple and nevertheless individual control of the circular knives for improved yield and reduction of incorrect incisions.

The object is also achieved by a method having the steps referred to hereinbefore in that the two circular knives are each pivoted about an axis I, II that differs from the horizontal orientation during the separating incision depending on the detected and/or determined measuring data, the axes I, II being oriented in such a way that, by pivoting the circular knives about the axes I and II, the point P of the smallest gap size between the circular knives is positioned differently from the lowest knife point M of the two circular knives. According to the invention, it is always possible to find the optimum distance between the circular knives or the optimum position of the point with the smallest gap dimension for the circular knives depending on the position of the fish the circular knives are located at.

According to the invention, the point P of the smallest gap size is positioned differently during transport of the fish through the two circular knives. In other words, the point P travels during processing of a single fish to different points P.

Preferably, the entire separating or dorsal incision from the tail fin up to the head region of the fish is performed with the two circular knives, wherein for introducing the fish between the circular knives said two circular knives have the point P of the smallest gap size at approximately the lowest knife point M and this point P of the smallest gap size travels out of the lowest knife point M by pivoting. In a starting position, the knives are parallel or in a slight V-position inclined towards each other so that the point P of the smallest gap size is at the lowest knife point M. This distance a at the lowest knife point is basically fixed, that is unchangeable during cutting, to achieve a minimum of fin support errors, particularly when the fish to be processed enter the separating device. By pivoting the circular knives about the axes I, II, the two circular knives or circular knife blades approach the machine centre to achieve a maximum yield. By pivoting about the axes I, II, the point P of the smallest gap size moves away from the lowest knife point M and travels upwards along the circumference of the circular knives, the circular knives with their cutting edges moving towards each other due to pivoting on one side while moving away from each other on the opposing side. The position of the point P of the smallest gap size preferred for maximum flesh recovery at which the two circular knives can almost touch each other then lies preferably slightly higher than the tips of the dorsal spokes. As soon as the fleshy region is detached or separated from the dorsal spokes, by pivoting about the axes I, II the position of the point P of the smallest gap size can be changed again, namely, for example, back to the lowest knife point M at which the point of the smallest gap size has the defined distance a, so that, for example, the dorsal fin can be guided through between the circular knives unobstructed and without damage.

An especially advantageous development of the invention provides for the dorsal spokes to be cut free with the two circular knives, the circular knives being controlled or pivoted in such a manner that the point P of the smallest gap size is located, at least in the region between the tail fin and the dorsal fin, immediately above the tips of the dorsal spokes.

Advantageously, only the circular knives themselves are pivoted about the axes I, II to change the position of the point P of the smallest gap size.

In a further preferred option, the entire units, each comprising a drive and a circular knife, are each pivoted about the axes I, II to change the position of the point P of the smallest gap size.

In an advantageous development of the invention, fish-size-relevant data are detected and/or determined using a measuring means, and during the separating incision the two circular knives are controlled dependent on the detected and/or determined measuring data, namely pivoted about the axis I, II that differs from a horizontal orientation by means of pneumatic and/or servomotor-controlled actuating mechanisms.

In a further advantageous development of the invention, during the separating incision the two circular knives are each controlled, namely pivoted about the axis I, II that differs from the horizontal orientation exclusively by the actual fish to be processed.

The two circular knives are preferably controlled dependent on determined fish-size-relevant data and by the fish itself.

The advantages arising from this have already been described in connection with the apparatus according to the invention, which is particularly suited to performing the method, and is why reference will be made to the relevant passages to avoid repetitions.

BRIEF DESCRIPTION OF THE DRAWINGS

Further expedient and/or advantageous features and developments emerge from the dependent claims and the description. An especially preferred embodiment of the invention is explained in greater detail with reference to the attached drawing. The drawing shows:

DETAILED DESCRIPTION OF THE EMBODIMENTS

Figure 1:
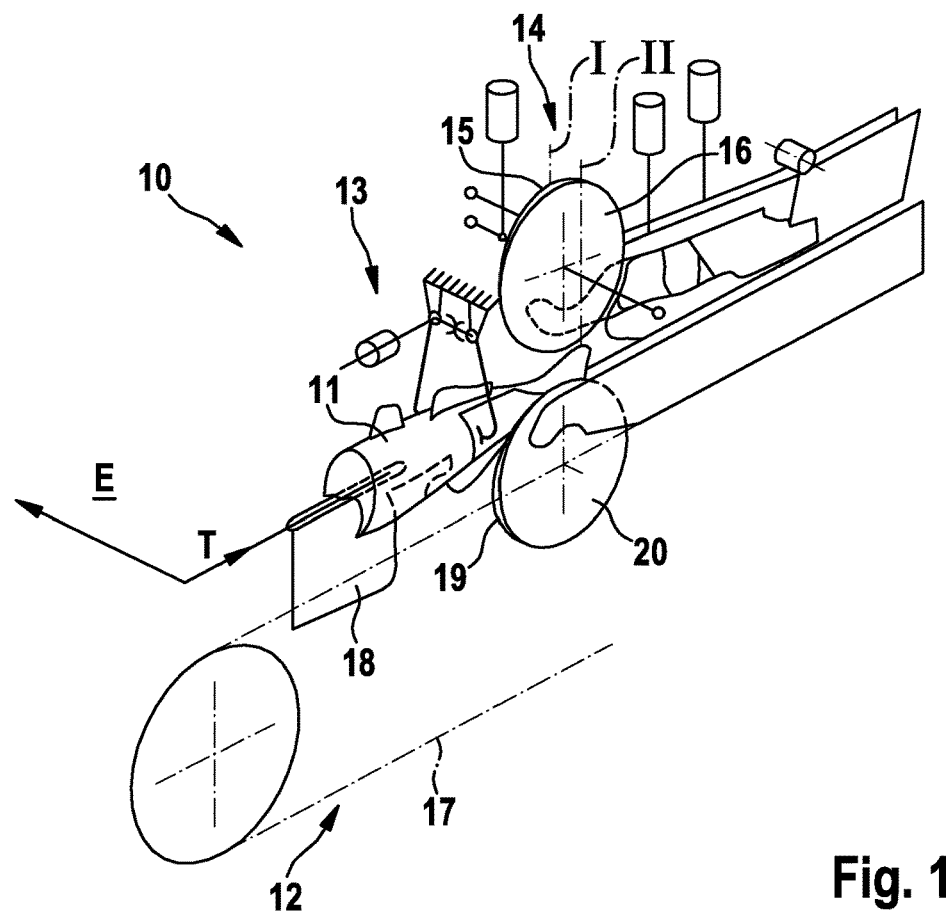
FIG. 1 a schematic representation of an apparatus according to the invention, comprising a measuring means for detecting and/or determining fish-size-relevant data, in a perspective view obliquely from above and the front, FIG. 2 the separating device with two circular knives in a view from the front in transport direction T, FIG. 3 the separating device according to FIG. 2 in a view from above in a starting position, and FIG. 4 the separating device according to FIG. 3 in a view from above in a yield-optimized pivoted position.

The apparatus illustrated in the drawing is used for automatically recovering flesh from beheaded and at least partially or largely gutted fish, the invention being explained in greater detail based on the dorsal knives or based on cutting free dorsal spokes in a white fish, in particular a cod. The apparatus can also be used, however, in the same manner for other species of fish, in particular salmon. The principle of the invention is basically applicable to an apparatus comprising two rotatably driven circular knives which are arranged at a distance from each other in order to form a gap and which are parallel or in a V-shaped arrangement to each other and thus is also applicable in the same manner, for example, to cutting free ventral spokes or other bones pertaining to the bone structure or bone structure sections.

Figure 2:
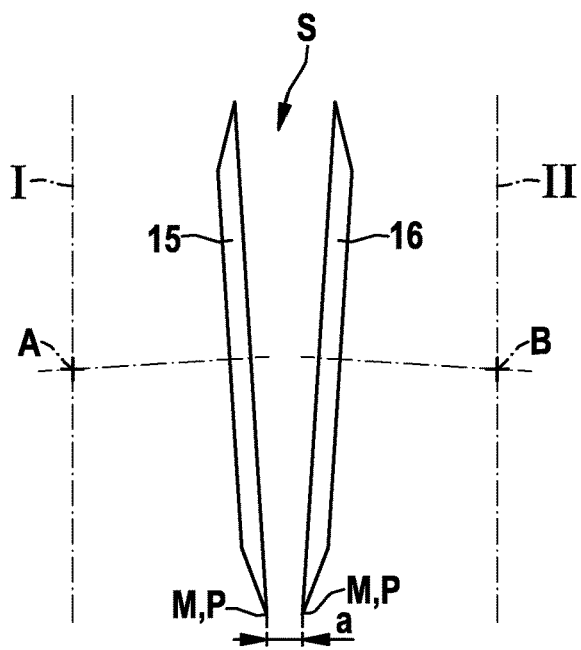

FIG. 1 illustrates an apparatus 10 for automatically recovering flesh from beheaded and gutted fish 11, comprising a transport device 12 for transporting the fish 11 tail-first along a transport path in transport direction T, and a separating device 14 for separating the flesh from the bone structure. The separating device 14 comprises at least two rotatably driven and controllable circular knives 15, 16 which are arranged at a distance from each other on mutually opposing sides of the transport path in order to form a gap S. The two circular knives 15, 16 can be parallel to each other or in a V-shaped arrangement to each other, the point P of the smallest gap size in the latter arrangement being at the lowest knife point M (see, for example, FIG. 2).

Figure 3:
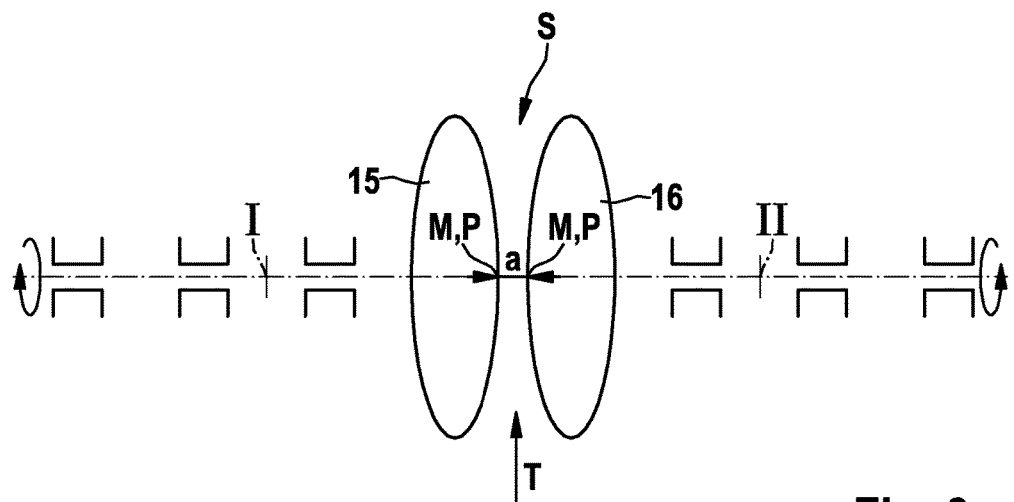
Figure 4:
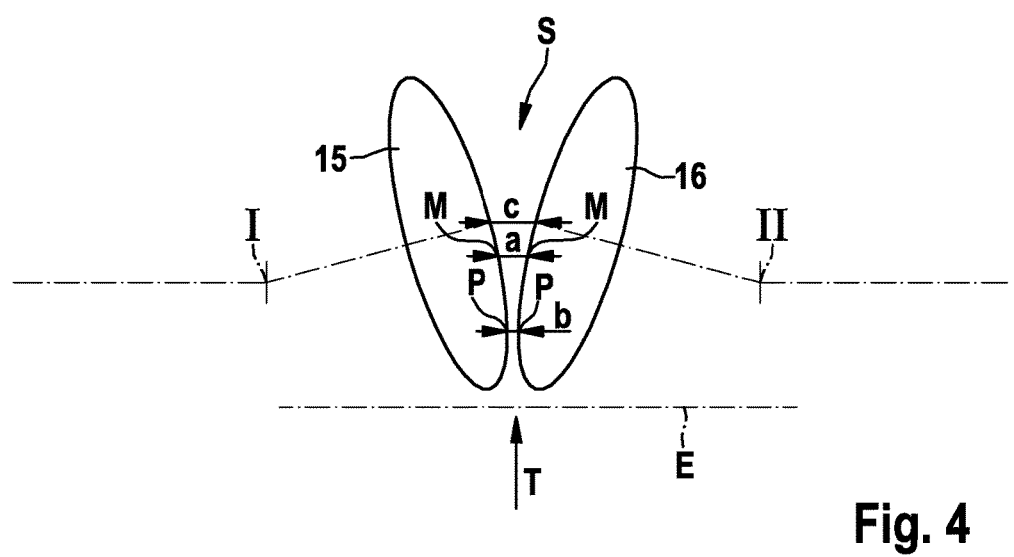

This apparatus 10 is characterized according to the invention in that the two circular knives 15, 16 are each designed to be pivotable about an axis I, II that differs from the horizontal orientation, the axes I, II being oriented in such a way that, by pivoting the circular knives about the axes I and II, the point P of the smallest gap size between the circular knives 15, 16 can be positioned differently from the lowest knife point M of the two circular knives 15, 16. Thus the circular knives 15, 16 have an additional degree of freedom which makes it possible to individually control the circular knives 15, 16 as required in respect of the size of the distance and in particular with regard to the position of the point P of the smallest gap size. The distance a of the two circular knives 15, 16 at the lowest knife point M is preferably constant and is only insignificantly influenced, if at all, by pivoting about the axes I, II. In a starting position, the point P of the smallest gap size and the lowest knife points M coincide (see, for example, FIGS. 2 and 3). As soon as the circular knives 15, 16 are pivoted out of this starting position, the point P of the smallest gap size on the one hand and the lowest knife points M on the other hand are apart from each other. As soon as the point P of the smallest gap size moves out of the overlap with the lowest knife points M due to pivoting about the axes I, II, the actual distance b at the point P of the smallest gap size between the circular knives 15, 16 is smaller than the distance a at the lowest knife points M (see, for example, FIG. 4). On the one hand, this adjustment can be performed by the fish itself and/or by the control system based on previously detected and/or determined measuring data continuously or in cycles, that is only at defined times.

When taken on their own or in combination with each other, the features and developments described below illustrate preferred embodiments. It is expressly pointed out that features which are summarised in the claims and/or the description or are described in a common embodiment can also further develop the apparatus 10 described above in a functionally independent manner.

As mentioned, the circular knives 15, 16 can be arranged parallel to each other or in a V-shaped arrangement. For this purpose, the circular knives 15, 16 are optionally adjustable about a substantially horizontally oriented axis A, B. A slight departure of the orientation from the horizontal by a few degrees is expressly included by the term "substantially". Due to the adjustability about the axes A, B, the circular knives 15, 16 can be moved out of the parallel arrangement into the V-shaped arrangement and back again. Moreover, the distance of the two circular knives 15, 16 from each other is also variable. In particular, the circular knives 15, 16 are prestressed, e.g. by means of mechanical springs, in such a manner that they are adjustable in respect of their distance from each other. The circular knives 15, 16 can be pushed apart automatically, e.g. by the backbone.

The circular knives 15, 16 can be rotatably driven by drives that are not shown. Each circular knife 15, 16 forms a unit with a drive. The units can also comprise articulation elements, transmission mechanisms and other components required for performing and transmitting rotations and/or adjusting movements of the circular knives 15, 16. The transport device 12 preferably comprises a rotating and continuously driven conveying element 17, for example a chain conveyor, on which at least one supporting body 18, which is also referred to as a saddle, is arranged. One fish 11, each, can be placed or saddled on this saddle in such a manner that the fish 11 can be transported tail-first with its back upwards along the transport path in transport direction T.

The circular knives 15, 16 are arranged above the transport device 12. Alternatively or additionally, the separating device 14 can also comprise further circular knives 19, 20 which are arranged underneath the transport device 12. More specifically, the circular knives 19, 20, which are designed and configured for cutting free the ventral spokes, are arranged in such a manner that the cutting edges of the circular knives 19, 20 engage in the fish 11 from below, that is ventrally. The two first-mentioned circular knives 15, 16 are designed and configured for cutting free the dorsal spokes. In a first embodiment, the axes I, II about which the circular knives 15, 16 are pivotable are in a vertical orientation. In other embodiments, however, the axes I, II can also be at an angle between 0° and 10° and in particular between 0° and 6° to the vertical orientation. Even an angular position of the axes I, II of greater than 10° to the vertical orientation is possible.

In a preferred embodiment, only the circular knives 15, 16 are each designed and configured to be pivotable themselves about the axis I, II. In this variant, the circular knives 15, 16 are then in operative connection with the drives using flexible linkages, as are indicated schematically in FIGS. 3 and 4. In other embodiments, the entire unit, comprising in each case a drive and a circular knife 15, 16, is designed and configured to be pivotable.

FIG. 1 illustrates an embodiment of the invention in which the apparatus comprises measuring means for detecting and/or determining fish-size-relevant data in such a manner that the two circular knives 15, 16 are controllable dependent on the detected and/or determined measuring data, namely pivotable in each case about the axis I, II that differs from a horizontal orientation. The detailed design of the measuring means 13 is not relevant to the invention and can therefore, in a known manner, comprise mechanical, electronic, optical or other known elements or element combinations which are suitable for detecting and/or determining fish-size-relevant data. The measuring means 13 comprises in particular such elements by means of which the size of each fish 11 and/or the width of each fish 11 and/or the position of the tail root and/or the position of the dorsal fin can be detected, thus in particular can be directly detected and/or can be determined via corresponding calculation models.

Both the circular knife 15, 16 itself and also the unit formed of drive and circular knife 15, 16 can be assigned an actuating mechanism which is controlled pneumatically and/or by servomotor. It is particularly quick and easy to switch backwards and forwards between two positions with the pneumatic mechanism. A controlled pivoting movement can be performed over the entire dorsal incision with the servomotor-controlled mechanism.

In a further embodiment of the invention which is not explicitly illustrated, the two circular knives 15, 16 are designed so as to be freely movable, in such a manner that they can only be controlled by the actual fish to be processed, namely they are each pivotable about the axis I, II that differs from a horizontal orientation. In further embodiments, the circular knives 15, 16 can be designed to be at least partially freely movable in such a manner that they are at least partially controllable by the fish to be processed and/or in combination dependent on the detected and/or determined measuring data.

All embodiments which have been described in connection with the dorsal knives, namely the circular knives 15, 16, also apply correspondingly to the ventral knives, namely the circular knives 19, 20. This also applies to the method for cutting free the dorsal spokes which is described below by way of example with reference to the drawing.

Each fish 11 is positioned manually or automatically on a supporting body 18, with the open and gutted abdominal cavity facing downwards and tail-first. The fish 11 with the supporting body 18 is transported in transport direction T by the transport device 12 towards the separating device 14. Before starting the separating incision at the tail, the two circular knives 15, 16 are in their starting position as illustrated, for example, in FIG. 2 or 3, namely with a distance a at the lowest knife point M and preferably slightly inclined towards each other forming a V-shape. In the starting position, the distance a forms the point P of the smallest gap size and is preferably about 5 mm. The point P of the smallest gap size (in the case of two circular knives 15, 16 spaced apart from each other, a line L of the smallest gap size forms between them) lies at the lower apex of the circular knives 15, 16 and is thus directed towards the backbone. In this starting position, in which the point of the largest distance of the two circular knives 15, 16 from each other lies at the upper apex of the circular knives, there is sufficient space for the fin seams in the tail region such that fin errors are prevented when the fish 11 is introduced between the circular knives 15, 16. As a result of continuously transporting the fish 11 in transport direction T, the incision begins as soon as the fish 11 or the flesh to be separated arrives in the operating area of the circular knives 15, 16.

To be able to control the circular knives 15, 16 individually during the separating or dorsal incision, the measuring means 13 can detect and/or determine fish-size-relevant data from each fish 11. For example, the tail root position and the position of the dorsal fin can be detected with a photoelectric sensor. The fish 11 or the bone structure can be measured completely before separating/cutting. The individual measuring steps, however, can also be carried out in each case individually and separately during separating/cutting. Alternatively, the circular knives 15, 16 can also be controlled merely by the fish itself or by a combination of active control (by an actuating mechanism) and passive control (by the fish itself), namely they can be pivoted about the axes I, II. In a corresponding manner, the movements about the axes A, B as well as the distance of the circular knives 15, 16 from each other can also be controlled.

When the fish, for example, reaches the operating area of the circular knives 15, 16 with the previously determined position of the tail root, they can change their position, since at this point in time the tail fin is already reliably outside the operating area of the circular knives 15, 16, namely between the circular knives 15, 16, in that the circular knives 15, 16 are pivoted about the axis I, II in such a way that the cutting edges of the circular knives 15, 16 move towards each other on the side directed towards the fish 11 or on the side opposing the transport direction T, that is in the region where the fish enters between the circular knives 15, 16. In other words, the circular knives 15, 16 can pivot inwards, about the axes I, II so that the point P of the smallest gap size moves or shifts away from the lowest knife point M along the circumference of the circular knives 15, 16 in the direction of fish travel in front of the centre point of the circular knives 15, 16, preferably until the point P of the smallest gap size lies just above the tips of the dorsal spokes. This pivoting brings about an approach of the circular knives 15, 16 or circular knife blades to a knife point, differing from the lowest knife point M, at which the distance of the circular knives 15, 16 is the amount b (see, for example, FIG. 4). The distance a at the lowest knife point has remained substantially the same but can also be changed, e.g. by the pressure of the backbone, the thickness of which can vary along its length. The distance b is smaller than a. The maximum yield can be achieved in this position of the circular knives.

Immediately before the fish 11 reaches the circular knives 15, 16 with its dorsal fin, the circular knives 15, 16 pivot open again in the opposite direction. The position or the beginning of the dorsal fin has been determined by the measuring means 13 such that the circular knives 15, 16 automatically pivot outwards out of the machine centre. This process of pivoting in and out can be repeated individually for each fish if there are other interference points in the operating area of the circular knives 15, 16 during the dorsal incision. After the dorsal incision has been completed, the circular knives 15, 16 are moved back into the starting position described above to be prepared for the following dorsal incision.

During control of the circular knives 15, 16 by the fish 11 itself, the fish size or, more precisely, the main/backbone (that is the bone shape) of the fish 11, which varies in shape and/or thickness from the tail end up to the head end, determines the respective pivoting movement of the circular knives 15, 16. This relates in particular to fish with a bone shape which varies over its length, such as in cod for example. In the basic position, the two circular knives 15, 16 are in the V-shaped basic position relative to each other starting at the tail end. This shows that the point P of the smallest gap size is directed towards the main/backbone of the fish 11. The widest point between the circular knives 15, 16 is at the upper apex of the circular knives 15, 16 and thus provides sufficient space for the fin seams in the tail region of the fish 11. Due to the changing cross-section of the main/backbone, it becomes necessary, for safely guiding the main backbone, which gets thicker towards the head end, to increase the gap between the circular knives 15, 16 and at the same time to alter the position of the circular knives 15, 16 to the effect that at the right time the circular knife blades can clear the required space for the upper tip of the then triangular cross-section of the main/central bone. As the circular knives 15, 16 can move freely about the axes I, II, different knife distances and positions of the circular knives 15, 16 emerge as each fish passes through the circular knives 15, 16. Due to the changed orientation of the circular knives 15, 16 to each other, the circular knives 15, 16 can adapt to the respective outline of the backbone. Moreover, orientation of the circular knives 15, 16 to the outline of the main backbone enables the circular knives 15, 16 to perform a deeper incision towards the backbone. Due to the fact that the circular knives 15, 16 can perform a deeper incision, the backbone is simultaneously guided and centred safely between the circular knives 15, 16.

In addition to the described movements or control possibilities about the axes I, II, the circular knives 15, 16 can additionally be pivoted, even superposed, about the substantially horizontally oriented axes A, B or in the transport plane E can be moved away from or towards the supporting body 18 transverse to the transport direction T. The transverse movement is preferably a movement initiated by the size of the fish 11 itself in that the circular knives 15, 16 can be pushed aside axially outwards, against a spring force for example.

The circular knives 15, 16 are controlled during the separating incision based on the detected and/or determined measuring data and/or by the fish itself. The entire separating or dorsal incision from the tail fin up to the head region is performed with the circular knives 15, 16, it being possible during this separating or dorsal incision to pivot the circular knives 15, 16 once or several times about the axes I, II so as to evade previously determined interference points, such as the tail fin, the dorsal fin or even adhesions. Only the circular knives 15, 16 can be pivoted for the pivoting or evasive movements. However, there is also the possibility of pivoting the entire unit comprising a drive and a circular knife 15, 16. The pivoting or adjusting movement can be performed by pneumatic components or preferably also by a servomotor.

The invention claimed is:

1. Apparatus for automatically recovering flesh from beheaded and gutted fish, comprising:
a transport device for transporting the fish tail-first along a transport path in transport direction T; and
a separating device for separating the flesh from the bone structure, the separating device having at least two rotatably driven and controllable circular knives which are arranged at a distance from each other on mutually opposing sides of the transport path in order to form a gap S,
wherein the two circular knives are designed such that the circular knives can each be pivoted about an axis I, II that differs from a horizontal orientation, wherein the axes I, II are oriented in such a way that, by pivoting the circular knives about the axes I and II, the point P of the smallest gap size between the circular knives can be positioned differently from the lowest knife point M of the two circular knives.

2. Apparatus according to claim 1, wherein the two circular knives are designed and configured to pivot about the axes I, II during operation of the apparatus, that is while recovering flesh.

3. Apparatus according to claim 1, wherein the two circular knives are arranged above the transport device and are designed and configured to perform the entire dorsal incision.

4. Apparatus according to claim 1, wherein the two circular knives are designed and configured for cutting free the dorsal spokes.

5. Apparatus according to claim 1, wherein the axes I and II are oriented at an angle between 0° and 10° and in particular between 0° and 6° to the vertical orientation.

6. Apparatus according to claim 1, wherein only the circular knives are each designed and configured to be pivotable themselves about the axis I, II.

7. Apparatus according to claim 1, wherein the entire units, each comprising a drive and a circular knife, are designed and configured to be pivotable in each case about the axis I, II.

8. Apparatus according to claim 1, wherein the apparatus comprises measuring means for detecting and/or determining fish-size-relevant data in such a manner that the two circular knives are controllable dependent on the detected and/or determined measuring data, namely each being pivotable about the axis I, II that differs from a horizontal orientation.

9. Apparatus according to claim 1, wherein a pneumatic and/or servomotor-controlled actuating mechanism is assigned to the circular knives for performing the adjusting or pivoting movement about the axes I, II.

10. Apparatus according to claim 1, wherein the two circular knives are designed so as to be at least partly freely movable, in such a manner that they can be controlled at least partly by the actual fish to be processed.

11. Apparatus according to claim 1, wherein the two circular knives are designed so as to be freely movable, in such a manner that they can only be controlled by the actual fish to be processed, namely they are each pivotable about the axis I, II that differs from a horizontal orientation.

12. Method for automatically recovering flesh from beheaded and gutted fish, comprising the steps:
transporting the fish tail-first along a transport path in transport direction T by a transport device; and
separating the flesh from the bone structure by means of a separating device, wherein the separation takes place by two rotatably driven circular knives of the separating device, which knives are arranged at a distance from each other on mutually opposing sides of the transport path in order to form a gap S and are controlled,
wherein the two circular knives are each pivoted during the separating incision about an axis I, II that differs from the horizontal orientation, wherein the axes I, II are oriented in such a way that, by pivoting the circular knives about the axes I and II, the point P of the smallest gap size between the circular knives is positioned differently from the lowest knife point M of the two circular knives.

13. Method according to claim 12, wherein the point P of the smallest gap size is positioned differently during transport of the fish through the two circular knives.

14. Method according to claim 12, wherein the entire separating or dorsal incision from the tail fin up to the head region of the fish is performed with the two circular knives, wherein for introducing the fish between the circular knives said two circular knives have the point P of the smallest gap size approximately at the lowest knife point M and this point P of the smallest gap size travels out of the lowest knife point M by pivoting.

15. Method according to claim 12, wherein the dorsal spokes are cut free with the two circular knives, wherein the circular knives are controlled or pivoted in such a manner that the point P of the smallest gap size is located, at least in the region between the tail fin and the dorsal fin, immediately above the tips of the dorsal spokes.

16. Method according to claim 12, wherein only the circular knives themselves are pivoted about the axes I, II to change the position of the point P of the smallest gap size.

17. Method according to claim 12, wherein the entire units, each comprising a drive and a circular knife, are each pivoted about the axes I, II to change the position of the point P of the smallest gap size.

18. Method according to claim 12, wherein fish-size-relevant data are detected and/or determined using a measuring means, and during the separating incision the two circular knives are controlled dependent on the detected and/or determined measuring data, namely pivoted about the axis I, II that differs from a horizontal orientation by means of pneumatic and/or servomotor-controlled actuating mechanisms.

19. Method according to claim 12, wherein during the separating incision the two circular knives are each controlled, namely pivoted about the axis I, II that differs from the horizontal orientation exclusively by the actual fish to be processed.

20. Method according to claim 12, wherein the two circular knives are controlled dependent on determined fish-size-relevant data and by the fish itself.

* * * * *